United States Patent
Raziperchikolaei

(10) Patent No.: US 12,530,435 B2
(45) Date of Patent: Jan. 20, 2026

(54) ONE-CLASS RECOMMENDER SYSTEM WITH HINGE PAIRWISE DISTANCE LOSS AND ORTHOGONAL REPRESENTATIONS

(71) Applicant: Rakuten Group, Inc., Tokyo (JP)

(72) Inventor: Ramin Raziperchikolaei, San Mateo, CA (US)

(73) Assignee: Rakuten Group, Inc., Tokyo (JP)

( * ) Notice: Subject to any disclaimer, the term of this patent is extended or adjusted under 35 U.S.C. 154(b) by 652 days.

(21) Appl. No.: 17/975,473

(22) Filed: Oct. 27, 2022

(65) Prior Publication Data

US 2024/0037191 A1  Feb. 1, 2024

Related U.S. Application Data

(60) Provisional application No. 63/392,826, filed on Jul. 27, 2022.

(51) Int. Cl.

| | |
|---|---|
| *G06F 7/00* | (2006.01) |
| *G06F 18/214* | (2023.01) |
| *G06F 18/22* | (2023.01) |
| *G06F 18/2433* | (2023.01) |

(52) U.S. Cl.
CPC ........ *G06F 18/2433* (2023.01); *G06F 18/214* (2023.01); *G06F 18/22* (2023.01)

(58) Field of Classification Search
CPC ..... G06F 18/2433; G06F 18/22; G06F 18/214
USPC .................................... 707/600–899; 706/45
See application file for complete search history.

(56) References Cited

U.S. PATENT DOCUMENTS

| | | |
|---|---|---|
| 7,987,188 B2 | 7/2011 | Neylon et al. |
| 8,386,336 B1 | 2/2013 | Fox et al. |
| 8,417,713 B1 | 4/2013 | Blair-Goldensohn et al. |
| 8,458,054 B1 | 6/2013 | Thakur |
| 10,354,184 B1 | 7/2019 | Vitaladevuni et al. |

(Continued)

FOREIGN PATENT DOCUMENTS

| | | |
|---|---|---|
| CN | 110019652 | 7/2019 |
| CN | 110309331 | 10/2019 |

OTHER PUBLICATIONS

Agarwal, Pankaj et al., "Personalizing Similar Product Recommendations in Fashion E-commerce", Jun. 29, 2018, 5 pages.

(Continued)

*Primary Examiner* — Isaac M Woo
(74) *Attorney, Agent, or Firm* — Lessani Law Group, PC

(57) ABSTRACT

Known methods for training a recommender system rely on both similar and dissimilar user-item pairs. Using dissimilar pairs introduces several challenges, such as increasing training time or labeling pairs with unknown interactions as dissimilar even though the user may like the item if presented with it. If only similar pairs are used in the known methods, the result is a collapsed solution in which all users and items are mapped to the same representations. The recommender system and methods disclosed herein overcome these challenges by using only similar pairs but adding two terms to the objective function that prevent a collapsed or partially-collapsed solution. Specifically, the objective function includes a pairwise distance loss term that keeps the average pairwise distance between representations greater than a margin, and an orthogonality loss term that reduces correlations between dimensions in the vector space.

20 Claims, 7 Drawing Sheets

(56) References Cited

U.S. PATENT DOCUMENTS

| | | |
|---|---|---|
| 10,614,381 B2 | 4/2020 | Hoffman et al. |
| 10,650,432 B1 | 5/2020 | Joseph et al. |
| 10,698,967 B2 | 6/2020 | Shen et al. |
| 10,769,524 B1 | 9/2020 | Natesh |
| 11,004,135 B1 | 5/2021 | Sandler et al. |
| 11,361,365 B2 | 6/2022 | Greenwald |
| 11,651,037 B2 | 5/2023 | Shi et al. |
| 11,669,759 B2 | 6/2023 | Horowitz et al. |
| 12,277,591 B2 | 4/2025 | Shi et al. |
| 2001/0021914 A1 | 9/2001 | Jacobi et al. |
| 2005/0162670 A1 | 7/2005 | Shuler, Jr. |
| 2006/0155684 A1 | 7/2006 | Liu et al. |
| 2007/0046675 A1 | 3/2007 | Iguchi et al. |
| 2007/0087756 A1 | 4/2007 | Hoffberg |
| 2008/0270363 A1 | 10/2008 | Hunt et al. |
| 2008/0294996 A1 | 11/2008 | Hunt et al. |
| 2008/0319829 A1 | 12/2008 | Hunt et al. |
| 2009/0006156 A1 | 1/2009 | Hunt et al. |
| 2009/0018996 A1 | 1/2009 | Hunt et al. |
| 2009/0110089 A1 | 4/2009 | Green |
| 2009/0125371 A1 | 5/2009 | Neylon et al. |
| 2009/0281923 A1 | 11/2009 | Selinger et al. |
| 2010/0114933 A1 | 5/2010 | Murdock et al. |
| 2010/0268661 A1 | 10/2010 | Levy et al. |
| 2014/0104495 A1 | 4/2014 | Preston et al. |
| 2014/0195931 A1 | 7/2014 | Kwon et al. |
| 2014/0321761 A1 | 10/2014 | Wang et al. |
| 2014/0330637 A1 | 11/2014 | Moran et al. |
| 2014/0344013 A1 | 11/2014 | Karty et al. |
| 2014/0351079 A1 | 11/2014 | Dong et al. |
| 2015/0112790 A1 | 4/2015 | Wolinsky et al. |
| 2015/0154229 A1 | 6/2015 | An et al. |
| 2015/0154508 A1 | 6/2015 | Chen et al. |
| 2015/0332374 A1 | 11/2015 | Fano et al. |
| 2015/0379732 A1 | 12/2015 | Sayre, III et al. |
| 2016/0155173 A1 | 6/2016 | Isaacson et al. |
| 2016/0180248 A1 | 6/2016 | Regan |
| 2016/0292148 A1 | 10/2016 | Aley et al. |
| 2017/0185894 A1 | 6/2017 | Volkovs et al. |
| 2017/0193011 A1 | 7/2017 | Kale et al. |
| 2017/0193997 A1 | 7/2017 | Chen et al. |
| 2018/0040064 A1 | 2/2018 | Grigg et al. |
| 2018/0158078 A1 | 6/2018 | Hsieh et al. |
| 2018/0204111 A1 | 7/2018 | Zadeh et al. |
| 2018/0276710 A1 | 9/2018 | Tietzen et al. |
| 2018/0308112 A1 | 10/2018 | Prentice et al. |
| 2019/0019016 A1 | 1/2019 | Ikeda et al. |
| 2019/0034875 A1 | 1/2019 | Bryan et al. |
| 2019/0244270 A1 | 8/2019 | Kim et al. |
| 2020/0004835 A1 | 1/2020 | Ramanath et al. |
| 2020/0004886 A1 | 1/2020 | Ramanath et al. |
| 2020/0005134 A1 | 1/2020 | Ramanath et al. |
| 2020/0005149 A1 | 1/2020 | Ramanath et al. |
| 2020/0005364 A1 | 1/2020 | Aznaurashvili et al. |
| 2020/0175022 A1 | 6/2020 | Nowozin |
| 2020/0211065 A1 | 7/2020 | Govindarajalu et al. |
| 2020/0380027 A1 | 12/2020 | Aggarwal et al. |
| 2021/0004437 A1 | 1/2021 | Zhang et al. |
| 2021/0012150 A1 | 1/2021 | Liu et al. |
| 2021/0073612 A1 | 3/2021 | Vahdat et al. |
| 2021/0081462 A1 | 3/2021 | Lu et al. |
| 2021/0097400 A1 | 4/2021 | Lee |
| 2021/0110306 A1 | 4/2021 | Krishnan et al. |
| 2021/0117523 A1 | 4/2021 | Kulkarni et al. |
| 2021/0133846 A1 | 5/2021 | Xu et al. |
| 2021/0150337 A1 | 5/2021 | Raziperchikolaei |
| 2021/0191990 A1 | 6/2021 | Shi et al. |
| 2021/0350393 A1 | 11/2021 | Dagley et al. |
| 2021/0382935 A1 | 12/2021 | Huang et al. |
| 2021/0383254 A1 | 12/2021 | Renders et al. |
| 2021/0397892 A1 | 12/2021 | Huang et al. |
| 2022/0114643 A1 | 4/2022 | Raziperchikolaei |
| 2022/0155940 A1 | 5/2022 | Olbrich et al. |
| 2022/0188371 A1 | 6/2022 | Kaza et al. |
| 2022/0207073 A1 | 6/2022 | Sohail et al. |
| 2022/0277741 A1 | 9/2022 | Chaudhary et al. |
| 2022/0300804 A1 | 9/2022 | Guan et al. |
| 2022/0414531 A1 | 12/2022 | Ong et al. |
| 2023/0033492 A1 | 2/2023 | Shi et al. |
| 2023/0036394 A1 | 2/2023 | Shi et al. |
| 2023/0036964 A1 | 2/2023 | Shi et al. |
| 2023/0045107 A1 | 2/2023 | Shi et al. |
| 2023/0055699 A1 | 2/2023 | Raziperchikolaei |
| 2023/0095187 A1 | 3/2023 | Zanoon et al. |
| 2023/0095226 A1 | 3/2023 | Xie et al. |
| 2023/0281448 A1* | 9/2023 | Ma ........................ G06N 3/084 706/21 |

OTHER PUBLICATIONS

Bhaskar, Karthik Raja Kalaiselvi et al., "Implicit Feedback Deep Collaborative Filtering Product Recommendation System", Sep. 8, 2020, 10 pages.

Extended European Search Report dated Jan. 17, 2024, European Patent Application No. 23186376.2, 12 pages.

Liu, Yudan et al. "Real-time Attention Based Look-alike Model for Recommender System", Proceedings of the 25th ACM SIGKDD International Conference on Knowledge Discovery & Data Mining, 2019.

Long et al., "Composite Correlation Quantization for Efficient Multimodal Retrieval", SIGIR '16, Jul. 17-21, 2016, pp. 1-11.

Luo, Mi et al., "Metaselector: Meta-Learning for Recommendation with User-Level Adaptive Model Selection", Proceedings of the Web Conference, 2020, pp. 2507-2513.

Ma, Yifei et al., "Temporal-Contextual Recommendation in Real-Time", KDD '20, Aug. 23-27, 2020, pp. 2291-2299.

Meshcheryakov, N. "Machine Learning and Algorithmic Bias: a Basic Qualitative Exploration of AI, Machine Learning, Bias and Regulation", Mar. 3, 2021, 140 pages.

Mooney, Raymond J., et al. "Content-Based Book Recommending Using Learning for Text Categorization", Proceedings of the Fifth ACM conference on Digital Libraries, 2000.

Nahta, Ravi et al., "Embedding metadata using deep collaborative filtering to address the cold start problem for the rating prediction task", Multimedia Tools and Applications, vol. 80, No. 12, Feb. 18, 2021, pp. 18553-18581.

Pan, Feiyang et al., "Warm up Cold-start Advertisements: Improving CTR Predictions via Learning to Learn ID Embeddings", Proceedings of the 42nd International ACM SIGIR Conference on Research and Development in Information Retrieval, 2019.

Raziperchikolaei, Ramin, et al. "Neural Representations in Hybrid Recommender Systems: Prediction versus Regularization", Proceedings of the 44th International ACM SIGIR Conference on Research and Development in Information Retrieval, 2021, pp. 1743-1747.

Raziperchikolaei, Ramin et al., "Shared Neural Item Representations for Completely Cold Start Problem", Fifteenth ACM Conference on Recommender Systems, 2021, pp. 422-431.

Ricci et al., "Recommender Systems Handbook", 2011, 845 pages.

Salakhutdinov, Russ, et al. "Probabilistic Matrix Factorization", Advances in Neural Information Processing Systems, 2007, pp. 1-8.

Sedhain et al, "AutoRec: Autoencoders Meet Collaborative Filtering", WWW 2015 Companion, May 18-22, 2015, pp. 1-2.

Shi, Shaoyun et al. "Attention-based Adaptive Model to Unify Warm and Cold Starts Recommendation", Proceedings of the 27th ACM International Conference on Information and Knowledge Management, 2018, pp. 127-136.

Slack, Dylan et al., "Fairness Warnings and Fair-MAML: Learning Fairly with Minimal Data", Proceedings of the 2020 Conference on Fairness, Accountability, and Transparency, 2020, pp. 200-209.

Strub et al., "Hybrid Recommender System based on Autoencoders", Workshop on Deep Learning for Recommender Systems, Sep. 2016, pp. 1-7.

Su et al., "Deep Joint-Semantics Reconstructing Hashing for Large-Scale Unsupervised Cross-Modal Retrieval", 2019, pp. 3027-3035.

Takács, Gábor, et al. "Matrix Factorization and Neighbor Based Algorithms for the Netflix Prize Problem", Proceedings of the 2008 ACM Conference on Recommender Systems, 2008, pp. 267-274.

(56) References Cited

OTHER PUBLICATIONS

Van den Oord, Aaron et al. "Deep content-based music recommendation", Advances in Neural Information Processing Systems 26 (2013), pp. 1-9.
Vartak, Manasi et al. "A Meta-Learning Perspective on Cold-Start Recommendations for Items", Advances in Neural Information Processing Systems, 2017.
Vilalta, Ricardo et al., "A Perspective View and Survey of Meta-Learning", Artificial Intelligence Review, Sep. 2001, pp. 77-95.
Vincent, Pascal et al. "Stacked Denoising Autoencoders: Learning Useful Representations in a Deep Network with a Local Denoising Criterion", Journal of Machine Learning Research, 2010, pp. 3371-3408.
Volkovs, Maksims et al. "Dropoutnet: Addressing Cold Start in Recommender Systems", Advances in Neural Information Processing Systems, 2017, pp. 1-10.
Wan et al., "Discriminative Latent Semantic Regression for Cross-Modal Hashing of Multimedia Retrieval", 2018 IEEE Fourth International Conference on Multimedia Big Data (BigMM), Oct. 21, 2018, pp. 1-7.
Wang et al., "Collaborative Deep Learning for Recommender Systems", KDD '15, Aug. 10-13, 2015, pp. 1235-1244.
Wang, Chong et al. "Collaborative Topic Modeling for Recommending Scientific Articles", Proceedings of the 17th ACM SIGKDD International Conference on Knowledge Discovery and Data Mining, 2011, 9 pages.
Wang et al., "Effective Multi-Modal Retrieval based on Stacked Auto-Encoders", Proceedings of the VLDB Endowment, Sep. 1-5, 2014, pp. 649-660.
Wang, Huiwei et al., "ML2E: Meta-Learning Embedding Ensemble for Cold-Start Recommendation", IEEE Access, Sep. 2020, pp. 165757-165768.
Wu et al., "Quantized Correlation Hashing for Fast Cross-Modal Search", Proceedings of the Twenty-Fourth International Joint Conference on Artificial Intelligence, 2015, pp. 3946-3952.
Wu et al., "Unsupervised Deep Hashing via Binary Latent Factor Models for Large-scale Cross-modal Retrieval", Proceedings of the Twenty-Seventh International Joint Conference on Artificial Intelligence, 2018, p. 2854-2860.
Xue, Hong-Jian, et al. "Deep Matrix Factorization Models for Recommender Systems", Proceedings of the Twenty-Sixth International Joint Conference on Artificial Intelligence, vol. 17, 2017, pp. 3203-3209.
Yang et al., "Shared Predictive Cross-Modal Deep Quantization", IEEE Transactions on Neural Networks and Learning Systems, vol. 29, No. 11, Nov. 2018, pp. 5292-5303.
Yin, Wenpeng "Meta-learning for Few-shot Natural Language Processing: a Survey", Jul. 2020, 7 pages.
Yu, Runsheng et al., "Personalized Adaptive Meta Learning for Cold-Start User Preference Prediction", 35th AAAI Conference on Artificial Intelligence, Feb. 2021, pp. 10772-10780.
Yuan, Bowen et al. "Improving Ad Click Prediction by Considering Non-displayed Events", Proceedings of the 28th ACM International Conference on Information and Knowledge Management, 2019.
Zhang, Shuai et al., "Autosvd++: an Efficient Hybrid Collaborative Filtering Model via Contractive Auto-encoders", Proceedings of the 40th International ACM SIGIR Conference on Research and Development in Information Retrieval, 2017, pp. 957-960.
Zhang et al., "Collaborative Quantization for Cross-Modal Similarity Search", 2019, pp. 1-10.
Zhang et al., "Large-Scale Multimodal Hashing with Semantic Correlation Maximization", Association for the Advancement of Artificial Intelligence, 2014, pp. 1-7.
Zhang, Yin et al. "A Model of Two Tales: Dual Transfer Learning Framework for Improved Long-tail Item Recommendation", Proceedings of the Web Conference 2021, pp. 2220-2231.
Zhang, Yang et al., "How to Retrain Recommender System? A Sequential Meta-Learning Method", Proceedings of the 43rd International ACM SIGIR Conference on Research and Development in Information Retrieval, 2020, pp. 1479-1488.
Zhang, Yongfeng, et al. "Joint Representation Learning for Top-N Recommendation with Heterogeneous Information Sources", Proceedings of the 2017 ACM Conference on Information and Knowledge Management, 2017, pp. 1-10.
Zhao, Tong "Learning to Search and Recommend From Users Implicit Feedback", Aug. 2018, 209 pages.
Zhu, Yongchun et al. "Learning to Warm up Cold Item Embeddings for Cold-Start Recommendation with Meta Scaling and Shifting Networks", Proceedings of the 44th International ACM SIGIR Conference on Research and Development in Information Retrieval, 2021, pp. 1167-1176.
Antoniou, +A53:A241 Antreas et al., "How to Train Your MAML", ICLR 2019.
Bansal, Trapit et al., "Learning to Few-Shot Learn Across Diverse Natural Language Classification Tasks", Proceedings of the 28th International Conference on Computational Linguistics, Dec. 2020, pp. 5108-5123.
Barkan, Oren et al. "CB2CF: a Neural Multiview Content-to-Collaborative Filtering Model for Completely Cold Item Recommendations", Proceedings of the 13th ACM Conference on Recommender Systems, 2019, pp. 1-9.
Bianchi, Federico et al., "Fantastic Embeddings and How to Align Them: Zero-Shot Inference in a Multi-Shop Scenario", SIGIR eCOM '20, Jul. 30, 2020, pp. 1-11.
Blei, David M. et al. "Latent Dirichlet Allocation", Journal of Machine Learning Research, 2003, pp. 993-1022.
Bohanec, Marko et al. "Explaining Machine Learning Models in Sales Predictions", Expert Systems with Applications 71, 2017, pp. 416-428.
Bronstein et al., "Data Fusion through Cross-modality Metric Learning using Similarity-Sensitive Hashing", 2010, pp. 1-8.
Cai, Qi et al., "Memory Matching Networks for One-Shot Image Recognition", Proceedings of the IEEE Conference on Computer Vision and Pattern Recognition, 2018, pp. 4080-4088.
Cao et al., "Collective Deep Quantization for Efficient Cross-Modal Retrieval", Proceedings of the Thirty-First AAAI Conference on Artificial Intelligence, 2017, pp. 3974-3980.
Cao et al., "Deep Visual-Semantic Hashing for Cross-Modal Retrieval", KDD '16: Proceedings of the 22nd ACM SIGKDD International Conference on Knowledge Discovery and Data Mining, Aug. 2016, pp. 1445-1454.
Cao et al., "Correlation Hashing Network for Efficient Cross-Modal Retrieval", 2016, pp. 1-12.
Chen, Jingyuan, et al. "Attentive Collaborative Filtering: Multimedia Recommendation with Item-and Component-Level Attention", Proceedings of the 40th International ACM SIGIR Conference on Research and Development in Information Retrieval, 2017, 10 pages.
Chen, Minmin et al. "Marginalized Denoising Autoencoders for Domain Adaptation", Proceedings of the 29th International Conference on Machine Learning, 2012.
Chen, Zhihong et al. "ESAM: Discriminative Domain Adaptation with Non-Displayed Items to Improve Long-Tail Performance", Proceedings of the 43rd International ACM SIGIR Conference on Research and Development in Information Retrieval, 2020, pp. 579-588.
Cheng et al., "Wide & Deep Learning for Recommender Systems", DLRS '16, Sep. 15, 2016, pp. 1-4.
Chopra, Sumit et al., "Learning a Similarity Metric Discriminatively, with Application to Face Verification", 2005 IEEE Computer Society Conference on Computer Vision and Pattern Recognition (CVPR'05), vol. 1. IEEE, 2005.
Deng et al., "DeepCF: a Unified Framework of Representation Learning and Matching Function Learning in Recommender System", 2019, pp. 1-9.
Ding et al., "Collective Matrix Factorization Hashing for Multimodal Data", 2014, pp. 4321-4328.
Dong et al., "A Hybrid Collaborative Filtering Model with Deep Structure for Recommender Systems", Proceedings of the Thirty-First AAAI Conference on Artificial Intelligence, 2017, pp. 1309-1315.

(56) References Cited

OTHER PUBLICATIONS

Dong, Manqing et al, "MAMO: Memory-Augmented Meta-Optimization for Cold-Start Recommendation", Proceedings of the 26th ACM SIGKDD International Conference on Knowledge Discovery & Data Mining, 2020.
Du, Zhengxiao et al. "Sequential Scenario-Specific Meta Learner for Online Recommendation", Proceedings of the 25th ACM SIGKDD International Conference on Knowledge Discovery & Data Mining, 2019, pp. 2895-2904.
Finn, Chelsea et al. "Model-Agnostic Meta-Learning for Fast Adaptation of Deep Networks", Proceedings of the 34th International Conference on Machine Learning, vol. 70, 2017, pp. 1126-1135.
Gao, Chen et al. "Cross-domain Recommendation Without Sharing User-relevant Data", The World Wide Web Conference, 2019, pp. 491-502.
Gharibshah, Zhabiz et al., "User Response Prediction in Online Advertising", ACM Comput. Surv., vol. 37, No. 4, Article 111, Aug. 2021, pp. 1-49.
Gharibshah, Zhabiz et al., "Deep Learning for User Interest and Response Prediction in Online Display Advertising", Data Science and Engineering 5.1, 2020, pp. 12-26.
Gong et al., "Learning Binary Codes for High-Dimensional Data Using Bilinear Projections", 2013, pp. 484-491.
Gopalan, Prem et al., "Scalable Recommendation with Hierarchical Poisson Factorization", UAI, 2015.
Guo et al., "DeepFM: a Factorization-Machine based Neural Network for CTR Prediction", Proceedings of the Twenty-Sixth International Joint Conference on Artificial Intelligence, 2017, pp. 1725-1731.
He, et al., "Neural Collaborative Filtering" Proceedings of the 26th International Conference on World Wide Web (WWW'17) [online], Apr. 3, 2017, pp. 173-182.
He et al., "Neural Factorization Machines for Sparse Predictive Analytics", SIGIR '17, Aug. 7-11, 2017, pp. 355-364.
He et al., "Outer Product-based Neural Collaborative Filtering", Proceedings of the Twenty-Seventh International Joint Conference on Artificial Intelligence 2018, pp. 2227-2233.
He, Xiangnan, et al. "NAIS: Neural Attentive Item Similarity Model for Recommendation", IEEE Transactions on Knowledge and Data Engineering, 2018, 13 pages.
Hooda, Rahul et al., "Social Commerce Hybrid Product Recommender", International Journal of Computer Applications, vol. 100, No. 12, Aug. 2014, pp. 43-49.
Jiang et al., "Deep Cross-Modal Hashing", 2017, pp. 3232-3240.
Kanagala, Mukhul "Product Recommendation System Using Machine Learning Techniques", California State University San Marcos, Dec. 10, 2020, pp. 1-32.
Koren, "Factorization Meets the Neighborhood: a Multifaceted Collaborative Filtering Model", KDD 2008, Aug. 24-27, 2008, pp. 426-434.
Koren, Yehuda, et al. "Matrix Factorization Techniques for Recommender Systems", Computer, Published by IEEE Computer Society, 2009, pp. 42-49.
Krishnan, Adit et al., "An Adversarial Approach to Improve Long-Tail Performance in Neural Collaborative Filtering", Proceedings of the 27th ACM International Conference on Information and Knowledge Management, 2018, pp. 1491-1494.
Kumar et al., "Learning Hash Functions for Cross-View Similarity Search", 2011, pp. 1-6.
Lee, Hoyeop et al. "MeLU: Meta-Learned User Preference Estimator for Cold-Start Recommendation", Proceedings of the 25th ACM SIGKDD International Conference on Knowledge Discovery & Data Mining, 2019, pp. 1073-1082.
Li et al., "Deep Binary Reconstruction for Cross-modal Hashing", MM '17, Oct. 23-27, 2017, pp. 1-8.
Li et al., "Deep Collaborative Filtering via Marginalized Denoising Auto-encoder", CIKM '15, Oct. 19-23, 2015, pp. 811-820.
Li et al., "Coupled Cycle-GAN: Unsupervised Hashing Network for Cross-Modal Retrieval", Thirty-Third AAAI Conference on Artificial Intelligence, 2019, pp. 176-183.
Li et al., "Deep Heterogeneous Autoencoders for Collaborative Filtering", 2018, pp. 1-6.
Li et al., "Self-Supervised Adversarial Hashing Networks for Cross-Modal Retrieval", 2018, pp. 4242-4251.
Lian et al., "xDeepFM: Combining Explicit and Implicit Feature Interactions for Recommender Systems", KDD 2018, Aug. 19-23, 2018, pp. 1-10.
Linden, Greg et al., "Amazon.com Recommendations: Item-to-Item Collaborative Filtering", IEEE Internet Computing, 2003, pp. 76-80.
Liu et al., "Recommender Systems with Heterogeneous Side Information", WWW '19, May 13-17, 2019, pp. 1-7.

\* cited by examiner

PREDICTION PHASE EMBODIMENTS

EXAMPLE SYSTEM ARCHITECTURE

ONE-CLASS RECOMMENDER SYSTEM WITH HINGE PAIRWISE DISTANCE LOSS AND ORTHOGONAL REPRESENTATIONS

RELATED APPLICATIONS

This application claims the benefit of U.S. Provisional Application No. 63/392,826 filed on Jul. 27, 2022, and titled "One Class Recommendation Systems with the Hinge Pairwise Distance Loss and Orthogonal Representations," the contents of which are incorporated by reference herein as if fully disclosed herein.

BACKGROUND OF THE INVENTION

1. Field of the Invention

This invention relates generally to machine learning-based recommender systems and, more specifically, to a one-class recommender system that is trained with only similar user-item pairs and an objective function that includes a pairwise distance loss term and an orthogonal loss term.

2. Description of the Background Art

Recommender systems (RSs) are used on many shopping platforms. The goal of a recommender system is to take known user feedback and predict unknown user feedback on an item. The feedback, often referred to as a user-item interaction, can be implicit (e.g., purchased/clicked on) or explicit (e.g., a rating between 1 and 5). The predicted feedback can be used to either recommend items to users or to provided targeted advertising for items on a shopping platform.

In the case of implicit feedback, which is a common scenario in the real world, we know only if the user interacted with an item or not (such as clicked on, purchased, etc.). The goal of one-class recommender systems is to solve the implicit "one-class" feedback prediction problem. It is called a "one class" problem since a "no interaction" between a user and an item in the training set does not necessarily mean that the user does not like that item. It just means that we do not have information about their interaction. That is because the set of the items in a recommender system is huge, and the users cannot see all the items. Users can only see a small subset of items and then interact with a few of them.

There are three main steps in training an RS model to predict a user-item interaction. The first step is to learn user and item vector representations. This can be done by learning user and item matrices from user and item IDs, learning user and item multi-layer perceptron (MLPs) from user-item interaction vectors and/or side information, or learning graph neural networks from the bipartite user-item graph.

The second step is to model the interaction score from the user and item vector representations. The common ways to compute the interaction score are the following: (1) taking the dot product of the user and item representations, (2) computing the cosine similarity of the user and item representations, and (3) applying neural networks over the concatenated user and item representations.

The third step is to optimize a loss function, which generates smaller values as the RS model outputs larger user-item interaction scores for similar user-item pairs compared to the dissimilar ones. Different types of loss functions have been used in known solutions. Mean squared error (MSE) loss and binary cross-entropy (BCE) directly minimize the difference between the predicted and the actual scores. The Bayesian personalized rank (BPR) loss tries to make the interaction score of the similar pairs greater than the dissimilar ones, instead of directly mapping them to the actual scores. The contrastive learning loss tries to put representations of similar user-item pairs close to each other and put the dissimilar ones far away.

In a recommender system that is trained on implicit user-item feedback, "similar user-item pairs" are user-item pairs that have a known interaction, such as the user buying the item or clicking on the item. "Dissimilar user-item pairs" are user-item pairs for which there is no known interaction and for which a negative relationship between the user and the item is assumed for training purposes.

All the above loss functions need both similar and dissimilar pairs of the users to learn a model. This is because, as illustrated in FIG. 1A, these loss functions have both: (1) an attractive loss term that, for each similar user-item pair in the training dataset, effectively minimizes the distance in the vector space between user and item vector representations; and (2) a repulsive loss term that, for each dissimilar user-item pair in the training dataset, effectively maximizes the distance in the vector space between the user and item vector representations. If these loss functions are trained using only similar pairs, then only the attractive loss term is used. As shown in FIG. 1B, the result is a collapsed solution: all representations will be mapped to the same point in the latent space, and the model predicts the same interaction score for all the pairs. The performance of the collapsed solution is as bad as assigning random representations to the users and items. To avoid the collapsed solution, dissimilar pairs are essential in training an RS model using any of these conventional loss functions.

In one-class recommendation systems, there is only access to known, implicit interactions. The rest of the interactions are unknown. To create a dissimilar set of user and item pairs, the common approach is to randomly select a set of user and item pairs with unknown interactions and consider them dissimilar. Another strategy is to find out the hard-negatives: the pairs with the unknown interactions that the model has difficulty with classifying as dissimilar.

Creating dissimilar pairs from user-item pairs with unknown interactions is problematic for two main reasons. First, a large number of dissimilar pairs is needed to achieve reasonable results, which makes training slow. Second, a pair with no interaction does not necessarily mean that the user did not like the item. Using a large number of dissimilar pairs which hurts performance, as some of the pairs are likely to be pairs in which the user would have an affinity for the item if the user knew about the item. ("false dissimilar pairs"). The issue is more severe in the hard negative approach, since "false dissimilar pairs" are by definition difficult to be classified as dissimilar, and will be mistakenly taken as hard negatives.

Therefore, there is demand for a solution that enables an RS model to be trained without dissimilar pairs while still avoiding the collapsed solution and achieving state-of-the art results.

SUMMARY OF THE DISCLOSURE

The present disclosure relates to a one-class recommender system that is trained using only similar user-item pairs and without dissimilar user-item pairs. The collapsed solution discussed above, as well as a partially-collapsed solution discussed below, is avoided in training the recommender system by using a loss function that includes a pairwise distance loss term and an orthogonality loss term. The pairwise distance loss avoids the collapsed solution by keeping the average pairwise distance between all vector representations in the vector space greater than a margin. The orthogonality loss term avoids a partially-collapsed solution by reducing correlations between the dimensions in the vector space.

In one embodiment, a method for training a one-class recommender model and using the model to predict an interaction value for a user and item comprises the following steps:
 (a) obtaining a training dataset that includes user and item data for only similar user-item pairs, wherein:
  the training dataset does not include dissimilar user-item pairs;
  similar user item pairs are user-item pairs that have a known interaction; and
  dissimilar user-item pairs are user-item pairs for which there is no known interaction;
 (b) applying the model to the similar user-item pair data in the training dataset to obtain a predicted interaction value for each of the similar user-item pairs, wherein obtaining the predicted interaction value includes generating vector representations in a vector space of the user and items in the training dataset;
 (c) calculating a loss value for the model using a loss function that comprises the following loss terms:
  an attractive loss term that minimizes a distance in the vector space between the vector representations of the user and the item in each of the similar user-item pairs in the training dataset;
  a pairwise distance loss term that keeps the average pairwise distance in the vector space between all vector representations in the training dataset greater than a margin; and
  an orthogonality loss term that reduces correlations between the dimensions in the vector space;
 (d) adjusting a set of trainable parameters of the model to reduce the loss value; and
 repeating steps (b)-(d) for a number of iterations; and
using the trained model to obtain user-item interaction value predictions with respect to user and item pairs for which no interaction value is known.

DETAILED DESCRIPTION OF THE PREFERRED EMBODIMENTS

The present disclosure relates to a one-class recommender system that is trained using only similar user-item pairs and without dissimilar user-item pairs. "Similar user-item pairs" are user-item pairs that have a known interaction, such as the user buying the item or clicking on the item. Dissimilar user-item pairs are user-item pairs for which there is no known interaction and for which a negative relationship between the user and the item is assumed for training purposes. As discussed in more detail below, the collapsed solution discussed above is avoided in training the recommender system by using a loss function that includes a pairwise distance loss term and an orthogonality loss term. The pairwise distance loss avoids the collapsed solution by keeping the average pairwise distance between all vector representations in the vector space greater than a margin. The orthogonality loss term avoids a partially-collapsed solution by reducing correlations between the dimensions in the vector space.

The methods described herein are performed by a computer system ("the system" or "the recommender system"). Both a training phase and a prediction phase are described below for the recommender system. During the training phase, a machine-learning model used by the recommender system is trained to predict user-item interactions. During the prediction phase, the model is used to predict user-item interactions for user and item pairs with unknown interactions.

1. Mathematical Notations

With respect to mathematical notations used herein, let $R \in \mathbb{R}^{m \times n}$ denote a user-item interaction matrix, where m and n are the number of users and items, respectively. $R_{jk}$ is the interaction value for user j and item k. $R_{jk}=1$ means user j interacted with (e.g., purchased) item k, and $R_{jk}=0$ means the interaction is unknown. The ith row of matrix H is shown by $H_{i,:}$ and the jth column is shown by $H_{:,j}$. The d-dimensional representations of all users and all items are denoted by $Z^u \in \mathbb{R}^{m \times d}$ and $Z^i \in \mathbb{R}^{n \times d}$, respectively. The representations of the jth user and the kth item are denoted by $z_j^u = Z_{j,:}^u$ and $z_k^i = Z_{k,:}^i$, respectively.

2. One-Class Recommender Model

Figure 6:
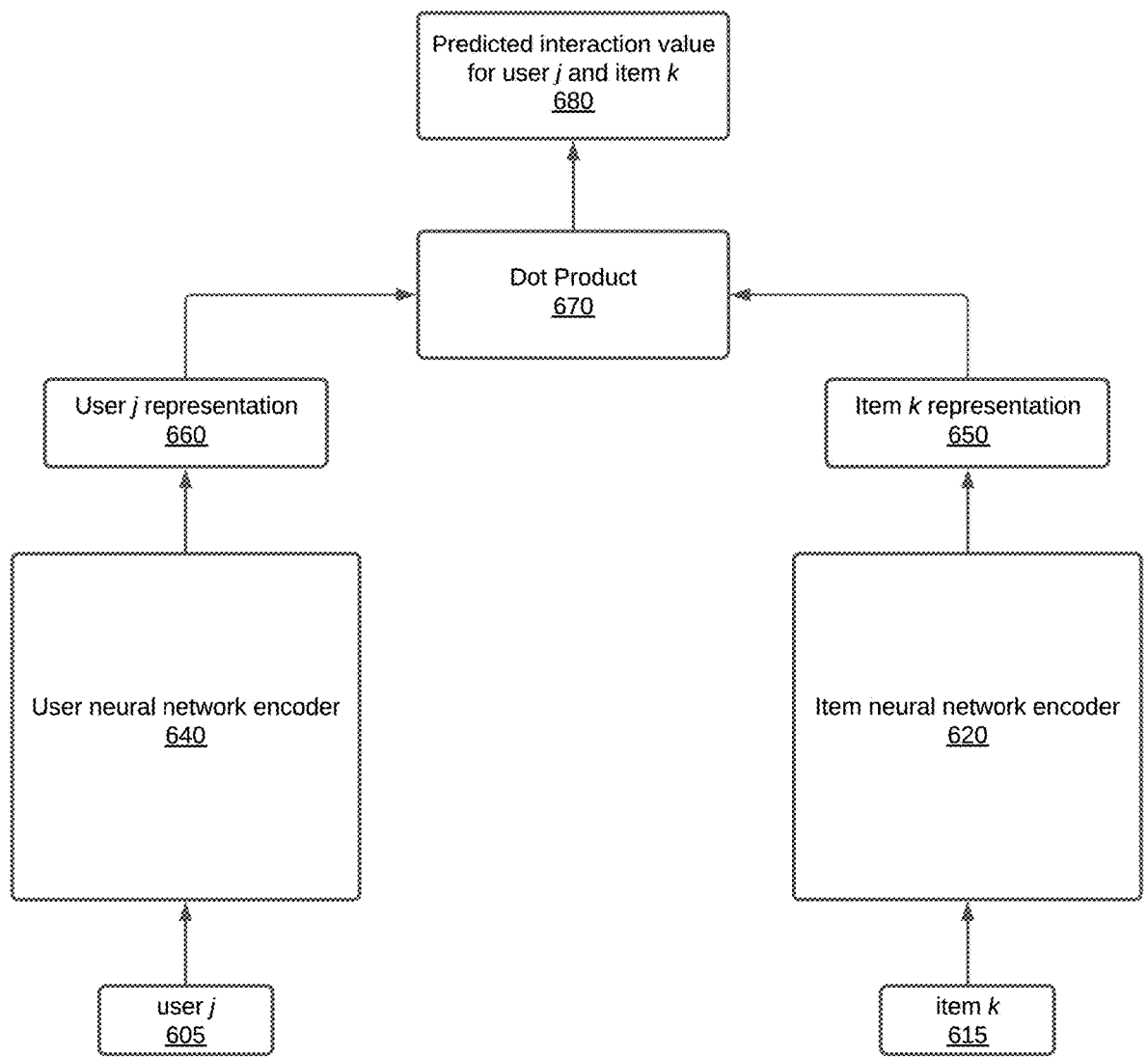
FIG. 6 is a block diagram that illustrates an example recommender model architecture according to one embodiment.

The recommender system uses a machine-learning model to predict user-item interaction values ("the model" or "the one-class recommender model"). FIG. 6 illustrates an example model architecture according to one embodiment. The model includes a user neural network encoder 640 that generates a user vector representation 660 from user input data 605. The model also includes an item neural network encoder 620 that generates an item vector representation 650 from input item data 615. In certain embodiments, the predicted interaction value 680 for the user and item is the dot product 670 of the user and item representations. In other embodiments, the predicted interaction value is obtained by taking the cosine similarity of the user and item representations, or concatenating the representations and applying a neural network to the concatenated representations. Training the model comprises learning the parameters of the user and item neural network encoders that provide the most accurate predictions.

3. Training Phase

Figure 1A:
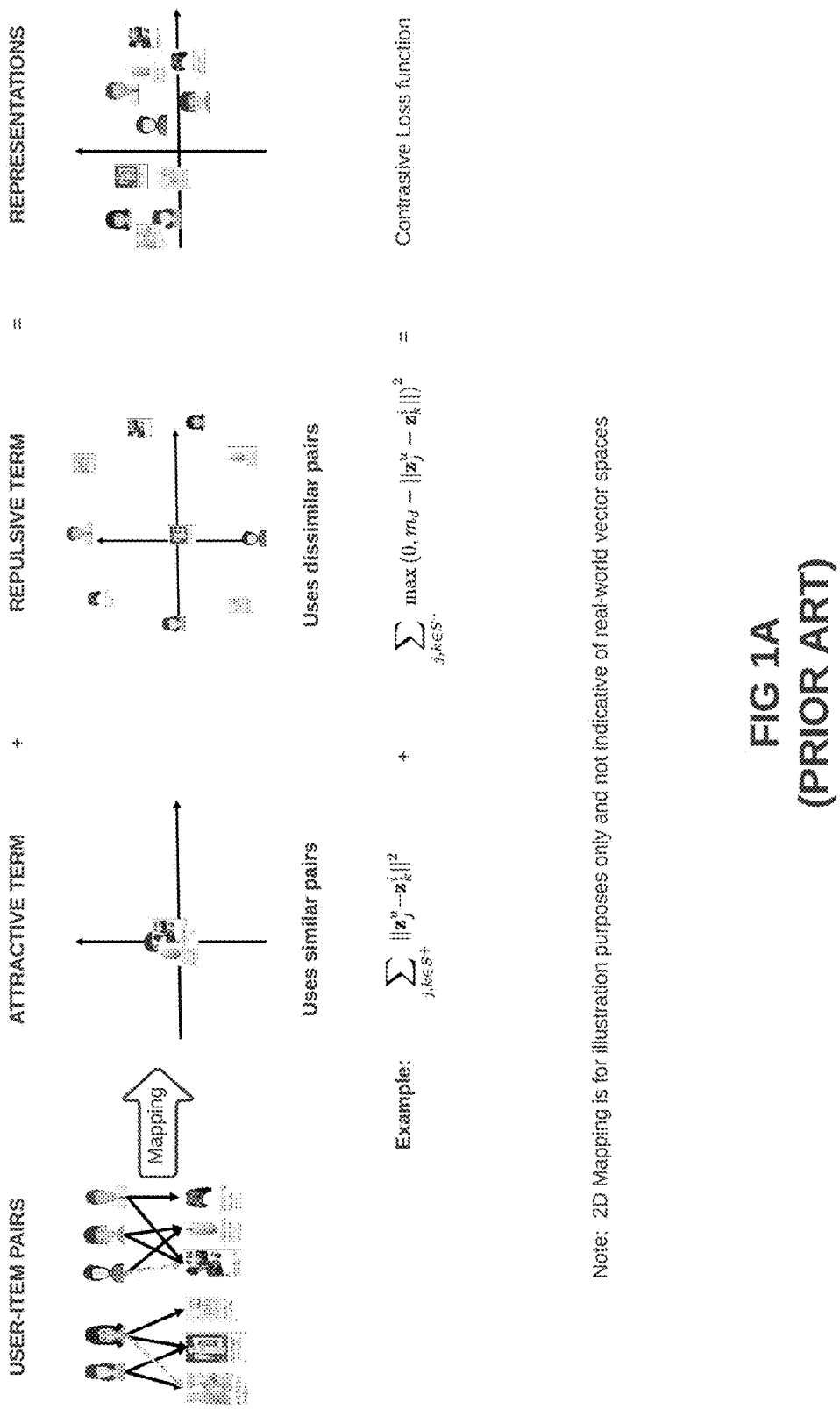
FIGS. 1A-1B are block diagrams that illustrate prior art loss functions.
Figure 1B:
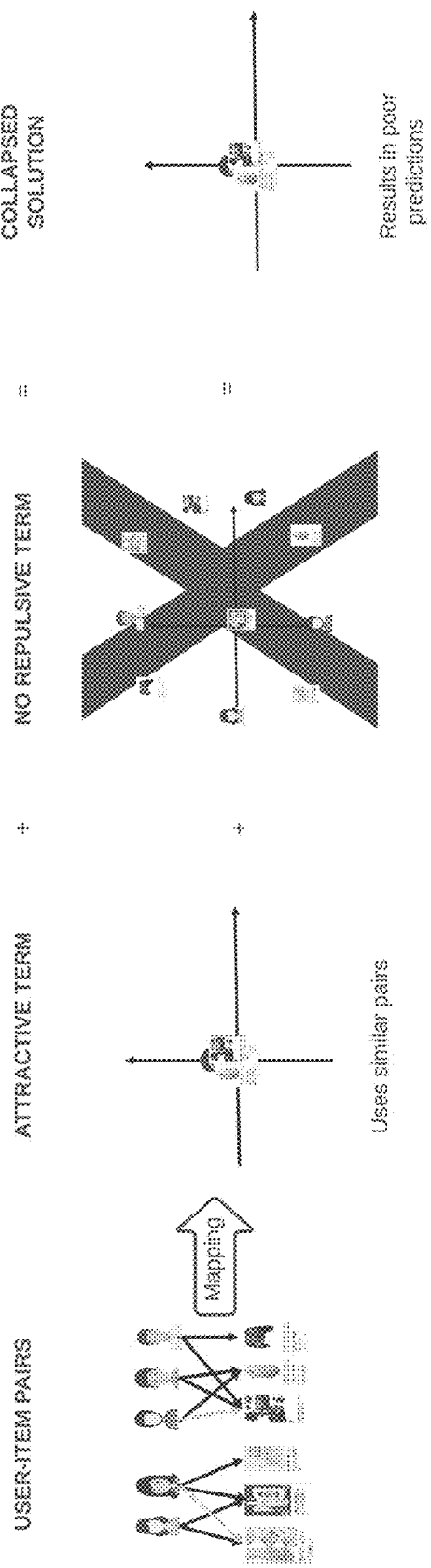
Figure 2:
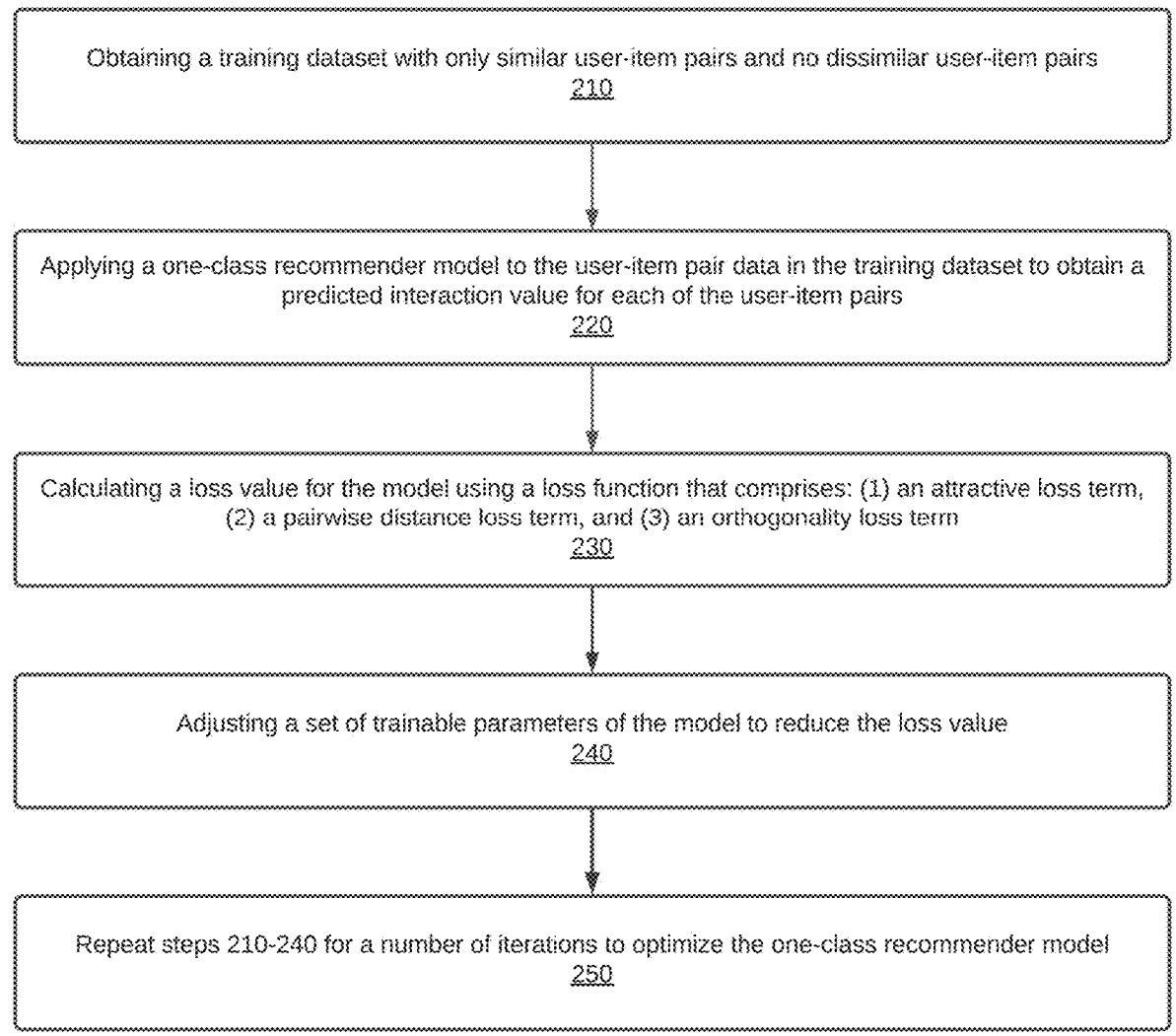
FIG. 2 is a flowchart that illustrates a method, according to one embodiment, for training a one-class recommender model.

FIG. 2 illustrates a method for training the one-class recommender model used by the recommender system to make user-item interaction predictions.

3.1. Applying the One-Class Recommender Model to Training Data with Only Similar Pairs The system obtains a training dataset with only similar user-item pairs and no dissimilar user-item pairs (step 210). As stated above, a similar user-item pair is a user-item pair with a known interaction value. For example, a user-item pair in which a user clicked on or purchased. The training data set includes user data and item data for each user-item pair. For example, the user data may include user IDs and/or user-item interaction vectors, and the item data may include side item data, such as item description, item price, item category, and item image. This data is the input for the one-class recommender model.

The system applies the one-class recommender model to the user-item pair data in the training dataset to obtain a predicted interaction value for each of the similar user-item pairs (step 220).

3.2 Calculating a Loss for the Model

Figure 3:
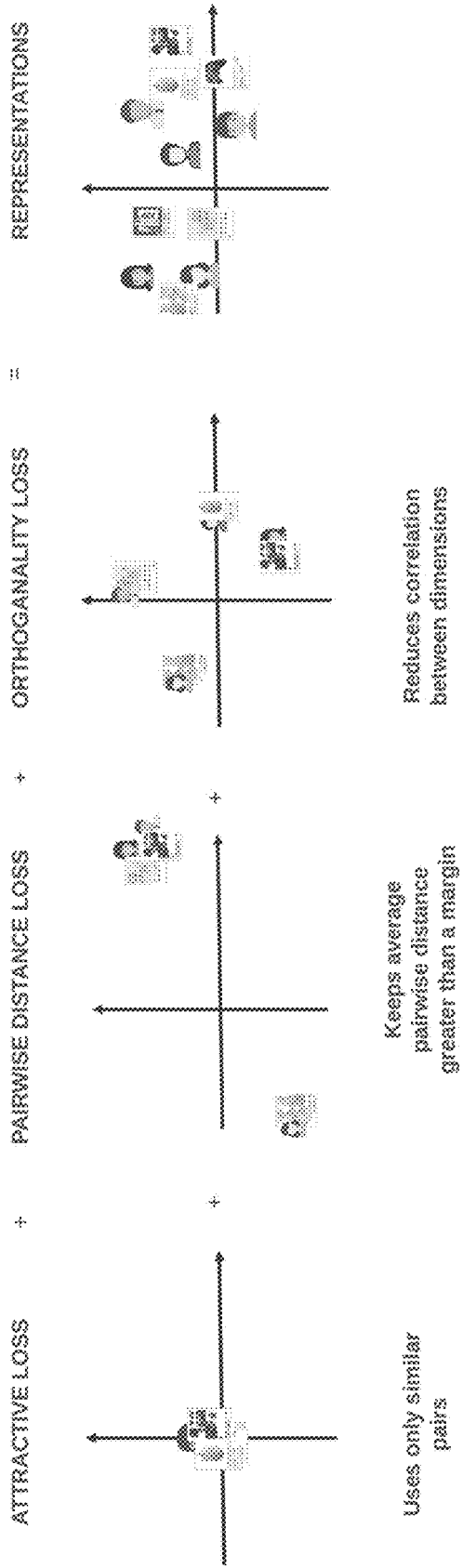
FIG. 3 is a block diagram that illustrates a novel loss function for training a one-class recommender model.

As illustrated in FIG. 3, the system calculates a loss value for the model using a loss function that includes following: (1) an attractive loss term, (2) a pairwise distance loss term, and (3) an orthogonality loss term (step 230). The 2D mappings shown in FIG. 3 are for ease of illustration only. In reality, user and item representations would be mapped to a vector space with many more dimensions (e.g., 100 dimensions). The terms "loss function" and "objective function" are used interchangeably herein.

The three loss terms are discussed in more detail below.

3.2.1 Attractive Loss Term

For each similar user-item pair in the training data, the attractive loss term minimizes a distance in the vector space between the user vector representation and the item vector representation for the pair. The attractive loss term may be the attractive loss term in the loss functions used in known solutions. For example, it may be the attractive loss term in a mean-squared error loss or a contrastive loss. These are defined mathematically below:

Attractive loss term of mean-square error loss:

$$E_{MSE}(Z^u, Z^i) = E_{j,k \in S^+}((z_j^u)^T z_k^i - 1)^2$$

Attractive loss term of contrastive loss:

$$E_{cont}(Z^u, Z^i) = \sum_{j,k \in S^+} \|z_j^u - z_k^i\|^2$$

3.2.2 Pairwise Distance Loss Term

The pairwise distance loss term keeps the average pairwise distance between all vector representations in the vector space greater than a margin. This prevents the collapsed solution.

The average pairwise distance is based on the distances between all user-user representations, item-item representations, and user-item representations in the vector space. In one embodiment, the pairwise distance loss term is a hinge pairwise distance loss, which is explained below.

As noted above, the d-dimensional representations of all m users and all n items are denoted by $Z^u \in \mathbb{R}^{m \times d}$ and $Z^i \in \mathbb{R}^{n \times d}$, respectively. A joint user-item representation may be achieved by vertically concatenating the user and item representations, $Z=[Z^u, Z^i] \in \mathbb{R}^{(m+n) \times d}$. In such case, the average pairwise distance between all the representations in Z is computed as:

$$d_p = E_{cont}(Z, Z) = \frac{1}{(m+n)^2} \sum_{l,s=1}^{m+n} \|z_l - z_s\|^2$$

Where l denotes the lth representation in Z and s denotes the sth representation in Z.

Note that $d_p$ computes the average distance between all the user-user, item-item, and user-item representations, which is different from the attractive loss term of $E_{cont}(Z^u, Z^i)$ that computes the distance between similar pairs of users and items. At the collapsed solution, the average pairwise distance, $d_p$, equals zero. To avoid the collapsed solution, the average pairwise distance, $d_p$, must be greater than zero. The hinge pairwise loss term keeps the average pairwise distance $d_p$ greater than a margin. The hinge pairwise loss term is defined mathematically as follows:

$$E_{d_p}(Z) = \max(0, m_p - d_p)^2,$$

Where $m_p$ is the margin.

In one embodiment, computing the average pairwise distance $d_p$ involves computing the distance between all the user-user, item-item, and user-item representations. A faster way to compute $d_p$ is to compute the summation of the variance of each dimension. The equations set forth below show that computing the summation of twice the variance of each dimension is equivalent to computing the average pairwise distance between all the user-user, item-item, and user-item representations.

Let us denote the qth dimension of the lth representation as $z_{l,q}$, and the pairwise distance of the qth dimension as $d_q^p$. Then $d_p$ can be separated over the d dimensions:

$$d_p = \sum_{q=1}^{d} d_p^q = \frac{1}{(m+n)^2} \sum_{q=1}^{d} \sum_{l,s=1}^{m+n} (z_{lq} - z_{sq})^2$$

We can rewrite $d_p^q$ as:

$$d_p^q = \frac{1}{(m+n)^2} \sum_{q=1}^{d} \sum_{l,s=1}^{m+n} (z_{lq} - z_{sq})^2$$

$$= \frac{1}{(m+n)^2} \sum_{l,s=1}^{m+n} z_{lq}^2 + z_{sq}^2 - 2 z_{lq} z_{sq}$$

$$= 2 \text{var}(Z_{:,q})$$

Therefore, twice the variance of a dimension is equal to the average pairwise distances of the user-user, item-item, and user-item representations in that dimension. At the collapsed scenario, the variance of each dimension is 0, and to avoid this collapsed scenario, the summation of the variance of the dimensions must be greater than a margin.

In summary, the average pairwise distance, $d_p$, between all representations can be calculated by computing the summation of twice the variance of each dimension. The hinge pairwise loss term is included in the loss (objective) function used to train the model to ensure that the average pairwise distance $d_p$ is greater than a margin.

3.2.3 Orthogonality Loss Term

While the combination of the attractive term and the pairwise loss term in the objective function avoids the collapsed solution, these two terms alone may still result in a "partially collapsed solution." The partially collapsed solution returns only two sets of representations for the whole set of users. In other words, all user and items are mapped to one of essentially two representations. If the two sets of representations are far enough apart, the average variance of the dimensions are greater than the margin m p required by the pairwise loss term. Thus, requiring that the average pairwise distance be greater than a margin is insufficient to prevent the partially collapsed solution in some scenarios. Unfortunately, the partially collapsed solution also results in poor predictions.

A third loss term, namely, the orthogonality loss term, is used to avoid the partially-collapsed solution. In the partially-collapsed solution, there is a linear relationship between the dimensions of the vector space, Z, and, thus the dimensions in the vector spaces are highly correlated, meaning one dimension is predictive of another dimension. The orthogonality term makes the dimensions in the vector space orthogonal, and, thus, reduces the correlations between the dimensions. The orthogonality term may be expressed mathematically as follows:

$$E_{orth}(Z) = \sum_{q=1}^{d} \sum_{s=q+1}^{d} \hat{Z}_{:,q}^T Z_{:,s}$$

The combination of the pairwise distance loss term and the orthogonality term prevents both the collapsed solution and the partially collapsed solution in training the model.

3.2.4. Mathematical Expression

The objective function with all three loss terms, namely, the attractive loss term, the pairwise distance loss term, and the orthogonality loss term, may be expressed mathematically as follows:

$$E_{total} = \lambda_1 E_{cont}(Z^u, Z^i) + \lambda_2 E_{d_p}(Z) + \lambda_3 E_{orth}(Z)$$

$$= \lambda_1 \sum_{j,k \in S^+} \left\| z_j^u - z_k^i \right\|^2 + \lambda_2 \max(0, m_p - d_p)^2 + \lambda_3 \sum_{q=1}^{d} \sum_{s=q+1}^{d} \hat{Z}_{:,q}^T Z_{:,s}$$

Where $\lambda_1$, $\lambda_2$, and $\lambda_3$ are hyper-parameters of the model.

In the above, equation, the attractive loss term is the attractive term of a contrastive loss function. Other attractive loss terms may be used, such as the attractive term of the mean-squared error loss function, as shown in the below alternate objective function:

$$E_{total} = \lambda_1 E_{MSE}(Z^u, Z^i) + \lambda_2 E_{d_p}(Z) + \lambda_3 E_{orth}(Z)$$

$$= \lambda_1 \sum_{j,k \in S^+} ((z_j^u)^T z_k^i - 1)^2 + \lambda_2 \max(0, m_p - d_p)^2 + \lambda_3 \sum_{q=1}^{d} \sum_{s=q+1}^{d} \hat{Z}_{:,q}^T Z_{:,s}$$

3.3 Adjusting the Model Parameters and Optimizing the Model

After calculating the loss in step 230, the system adjusts the set of trainable parameters of the model to reduce the loss (step 240). The system repeats steps 210-240 for a number of iterations to optimize the model (step 250). The steps may be repeated until convergence is reached or for a fixed number of iterations.

4.0 Prediction Phase

In a prediction phase, the trained model may be used either to recommend users to shops for targeted advertisements or to recommend items to users on the ecommerce platform.

Figure 4A:
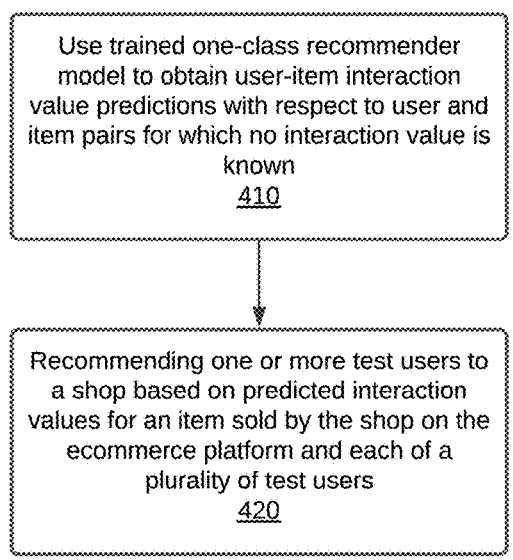
FIGS. 4A and 4B are flowcharts that illustrate methods for using a one-class recommender model to make recommendations during a prediction phase.

FIG. 4A illustrates a method for recommending users to shops in the prediction phase. The system uses the trained model to obtain user-item interaction value predictions with respect to user-item pairs on an ecommerce platform for which no interaction value is known (step 410). The system recommends one or more test users to a shop based on predicted interaction values for an item sold by the shop on the ecommerce platform and each of a plurality of test users (step 420).

Figure 4B:
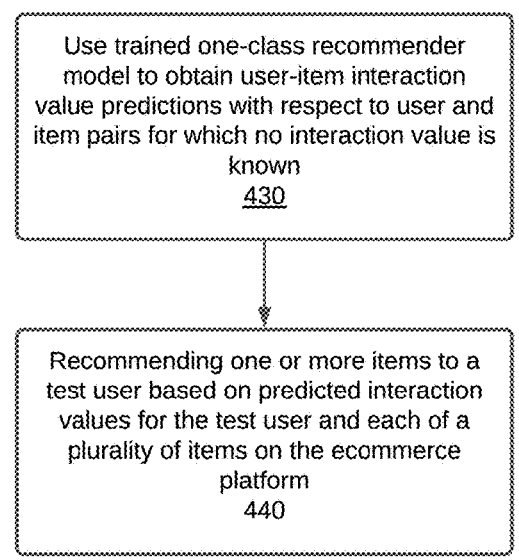

FIG. 4B illustrates a method for recommending one or more items to test users. The system uses the trained model to obtain user-item interaction value predictions with respect to user-item pairs on an ecommerce platform for which no interaction value is known (step 430). The system then recommends one or more items to a test user based on predicted interaction values for the test user and each of a plurality of items on the ecommerce platform (step 440).

5.0 Example System Architecture

Figure 5:
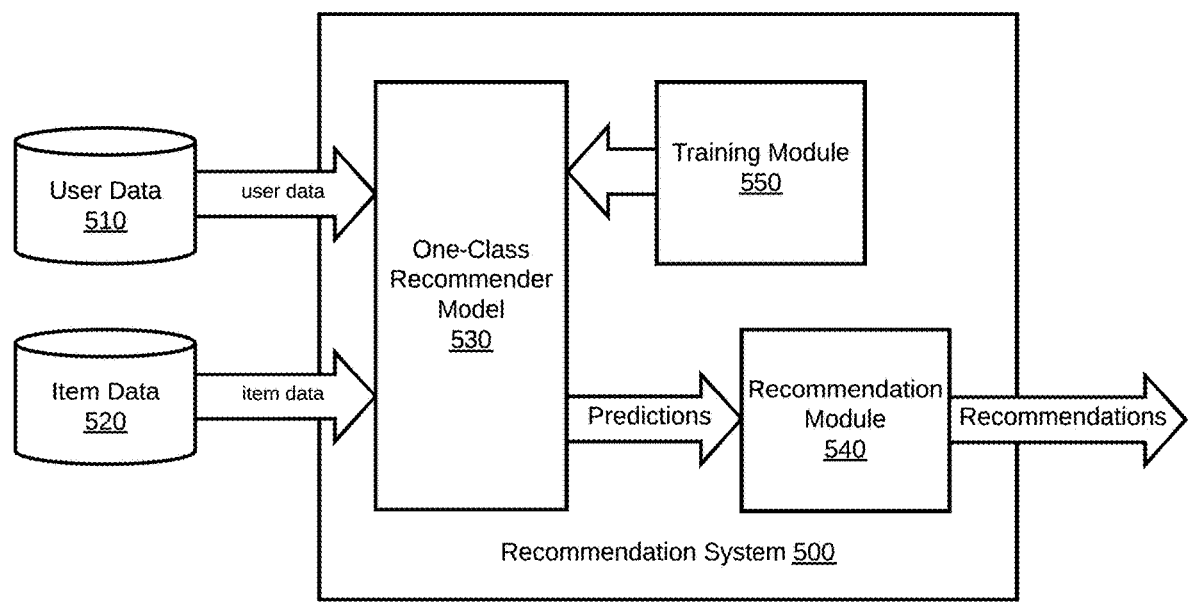
FIG. 5 is a block diagram of an example recommender system architecture according to one embodiment.

FIG. 5 illustrates an example system architecture for the recommender system. As described above, the recommender system includes a one-class recommender model 530 that predicts user-item interactions for user-item pairs. The input to the model is user data 510, such as user IDs and/or user-interaction vectors, and item data 520, such as side item data (e.g., item description, item price, item category, and item image). The model's predictions are outputted in the form of user-item interaction scores. A recommendation module 540 receives user-item interaction scores from the prediction model 530 and uses the scores to either recommend users to shops or items to users, as described above with respect to FIGS. 4A and 4B. A training module 550 trains the one-class recommender model 530 in accordance with the method of FIG. 2.

6.0 Experiments Show Improved Performance

The provisional applications incorporated by reference herein in the Related Applications section set forth results of experiments that compare the performance a recommender system that uses only similar pairs and is trained in accordance with the method of FIG. 2 and a conventional recommender system trained with both similar and dissimilar pairs and a conventional objective function. The result of the experiment is that the former system had better performance (recall) with less training data.

7.0 General

The methods described with respect to FIGS. 2-6 are embodied in software and performed by a computer system (comprising one or more computing devices) executing the software. A person skilled in the art would understand that a computer system has one or more physical memory units, disks, or other physical, computer-readable storage media for storing software instructions, as well as one or more processors for executing the software instructions. A person skilled in the art would also understand that a computer system may be a stand-alone computer or a network of computers working together, such as in a client-server architecture.

As will be understood by those familiar with the art, the invention may be embodied in other specific forms without departing from the spirit or essential characteristics thereof. Accordingly, the above disclosure is intended to be illustrative, but not limiting, of the scope of the invention.

The invention claimed is:

1. A method, performed by a computer system, for predicting an interaction value for a user and an item using a one-class recommendation model, the method comprising:
   training a one-class recommendation model by performing the following:
   (a) obtaining a training dataset that includes user and item data for only similar user-item pairs and excludes dissimilar user-item pairs, wherein:
   similar user item pairs are user-item pairs that have a known interaction; and
   dissimilar user-item pairs are user-item pairs for which there is no known interaction;
   (b) applying the model to the similar user-item pair data in the training dataset to obtain a predicted interaction value for each of the similar user-item pairs, wherein obtaining the predicted interaction value includes generating vector representations in a vector space of the user and items in the training dataset;
(c) calculating a loss value for the model using a loss function that comprises the following loss terms:
an attractive loss term that minimizes a distance in the vector space between the vector representations of the user and the item in each of the similar user-item pairs in the training dataset;
a pairwise distance loss term that keeps the average pairwise distance in the vector space between all vector representations in the training dataset greater than a margin; and
an orthogonality loss term that reduces correlations between the dimensions in the vector space;
(d) adjusting a set of trainable parameters of the model to reduce the loss value; and
(e) repeating steps (b)-(d) for a number of iterations; and
using the trained model to obtain user-item interaction value predictions with respect to user-item pairs for which there is no known interaction.

2. The method of claim 1, wherein the attractive loss term is a contrastive loss based on a distance in the vector space between the vector representations of the user and the item in each of the similar user-item pairs in the training dataset.

3. The method of claim 1, wherein the attractive loss term is a mean squared error loss based on a difference between the predicted interaction value and an actual interaction value for each of the similar user-item pairs within the training dataset.

4. The method of claim 1, wherein the pairwise distance loss term is a hinge pairwise distance loss.

5. The method of claim 1, wherein the orthogonality loss term makes dimensions in the vector space orthogonal.

6. The method of claim 1, wherein the trained model is used to predict user-item interactions for user-item pairs on an ecommerce platform for which no interaction value is known and wherein the method further comprises:
recommending one or more test users on the ecommerce platform to a shop on the platform based on predicted interaction values for an item sold by the shop and each of a plurality of test users.

7. The method of claim 1, wherein the trained model is used to predict user-item interactions for user-item pairs on an ecommerce platform for which no interaction value is known and wherein the method further comprises:
recommending one or more items to a test user on the ecommerce platform based on predicted interaction values for the test user and each of a plurality of items on the ecommerce platform.

8. A method, performed by a computer system, for training a one-class recommendation model to predict interaction values for users and items using training data that consists of only user-item pairs with positive interaction values, the method comprising:
(a) obtaining a training dataset that includes user and item data for only similar user-item pairs and excludes dissimilar user-item pairs, wherein:
similar user item pairs are user-item pairs that have a known interaction; and
dissimilar user-item pairs are user-item pairs for which there is no known interaction;
(b) applying the model to the similar user-item pair data in the training dataset to obtain a predicted interaction value for each of the similar user-item pairs, wherein obtaining the predicted interaction value includes generating vector representations in a vector space of the user and items in the training dataset;
(c) calculating a loss value for the model using a loss function that comprises the following loss terms:
an attractive loss term that minimizes a distance in the vector space between the vector representations of the user and the item in each of the similar user-item pairs in the training dataset;
a pairwise distance loss term that keeps the average pairwise distance in the vector space between all vector representations in the training dataset greater than a margin; and
an orthogonality loss term that reduces correlations between the dimensions in the vector space;
(d) adjusting a set of trainable parameters of the model to reduce the loss value; and
(e) repeating steps (b)-(d) for a number of iterations.

9. The method of claim 8, wherein the attractive loss term is a contrastive loss based on a distance in the vector space between the vector representations of the user and the item in each of the similar user-item pairs in the training dataset.

10. The method of claim 8, wherein the attractive loss term is a mean squared error loss based on a difference between the predicted interaction value and an actual interaction value for each of the similar user-item pairs within the training dataset.

11. The method of claim 8, wherein the pairwise distance loss term is a hinge pairwise distance loss.

12. The method of claim 8, wherein the orthogonality loss term makes all the vector representations in the training dataset orthogonal.

13. A system for predicting user-item interaction values on an ecommerce platform, the system comprising:
a processor configured to execute instructions programmed using a set of machine codes;
one or more memory units coupled to the processor; and
a one-class machine-learning recommendation model, stored in the one or more memory units of the system, that takes a user input and an item input and outputs a user-interaction score corresponding to a predicted user-interaction value for users and items on an ecommerce platform, wherein the model includes computational instructions implemented in the machine code for generating the output, and wherein the model is trained according to a method that comprises the following:
(a) obtaining a training dataset that includes user and item data for only similar user-item pairs and excludes dissimilar user-item pairs, wherein:
similar user item pairs are user-item pairs that have a known interaction; and
dissimilar user-item pairs are user-item pairs for which there is no known interaction;
(b) applying the model to the similar user-item pair data in the training dataset to obtain a predicted interaction value for each of the similar user-item pairs, wherein obtaining the predicted interaction value includes generating vector representations in a vector space of the user and items in the training dataset;
(c) calculating a loss value for the model using a loss function that comprises the following loss terms:
an attractive loss term that minimizes a distance in the vector space between the vector representations of the user and the item in each of the similar user-item pairs in the training dataset;
a pairwise distance loss term that keeps the average pairwise distance in the vector space between all vector representations in the training dataset greater than a margin; and an orthogonality loss term that reduces correlations between the dimensions in the vector space;

(d) adjusting a set of trainable parameters of the model to reduce the loss value; and repeating steps (b)-(d) for a number of iterations.

14. The system of claim 13, wherein the attractive loss term is a contrastive loss based on a distance in the vector space between the vector representations of the user and the item in each of the similar user-item pairs in the training dataset.

15. The system of claim 13, wherein the attractive loss term is a mean squared error loss based on a difference between the predicted interaction value and an actual interaction value for each of the similar user-item pairs within the training dataset.

16. The system of claim 13, wherein the pairwise distance loss term is a hinge pairwise distance loss.

17. The system of claim 13, wherein the orthogonality loss term makes all the vector representations in the training dataset orthogonal.

18. A non-transitory computer-readable medium comprising a computer program, that, when executed by a computer system, enables the computer system to perform the following method for predicting user-item interaction values on an ecommerce platform that includes products from different shops with different sales volumes, the method comprising:

applying a one-class recommendation model to user and item data on an ecommerce platform to obtain predicted user-item interaction values, wherein the one-class recommendation model was trained according to the following method:

(a) obtaining a training dataset that includes user and item data for only similar user-item pairs and excludes dissimilar user-item pairs, wherein:

similar user item pairs are user-item pairs that have a known interaction; and dissimilar user-item pairs are user-item pairs for which there is no known interaction;

(b) applying the model to the similar user-item pair data in the training dataset to obtain a predicted interaction value for each of the similar user-item pairs, wherein obtaining the predicted interaction value includes generating vector representations in a vector space of the user and items in the training dataset;

(c) calculating a loss value for the model using a loss function that comprises the following loss terms:

an attractive loss term that minimizes a distance in the vector space between the vector representations of the user and the item in each of the similar user-item pairs in the training dataset;

a pairwise distance loss term that keeps the average pairwise distance in the vector space between all vector representations in the training dataset greater than a margin; and an orthogonality loss term that reduces correlations between the dimensions in the vector space;

(d) adjusting a set of trainable parameters of the model to reduce the loss value; and repeating steps (b)-(d) for a number of iterations.

19. The non-transitory computer-readable medium of claim 18, wherein the pairwise distance loss term is a hinge pairwise distance loss.

20. The non-transitory computer-readable medium of claim 18, wherein the orthogonality loss term makes all the vector representations in the training dataset orthogonal.

* * * * *